(12) United States Patent
Tyler et al.

(10) Patent No.: US 7,193,581 B2
(45) Date of Patent: Mar. 20, 2007

(54) ELECTRONIC EQUIPMENT SHOCK ISOLATION/PROTECTION BUMPER, WITH INTEGRATED ANTENNA

(75) Inventors: Jeremy Tyler, Fort Collins, CO (US); Ronald D. Parsons, Longmont, CO (US); Jim Schilling, Lonetree, CO (US)

(73) Assignee: Miltope Corporation, Hope Hull, AL (US)

( * ) Notice: Subject to any disclaimer, the term of this patent is extended or adjusted under 35 U.S.C. 154(b) by 0 days.

(21) Appl. No.: 11/128,284

(22) Filed: May 13, 2005

(65) Prior Publication Data

US 2005/0264459 A1  Dec. 1, 2005

Related U.S. Application Data

(60) Provisional application No. 60/575,748, filed on Jun. 1, 2004.

(51) Int. Cl.
*H01Q 1/24* (2006.01)
*H01Q 1/42* (2006.01)

(52) U.S. Cl. .................. 343/872; 343/873; 343/702

(58) Field of Classification Search ............... 343/702, 343/782, 783; 455/90
See application file for complete search history.

(56) References Cited

U.S. PATENT DOCUMENTS

| | | | |
|---|---|---|---|
| 5,677,698 A | 10/1997 | Snowden | 343/770 |
| 5,966,098 A | 10/1999 | Qi et al. | 343/702 |
| 6,024,285 A | 2/2000 | Mish | |
| 6,339,400 B1 | 1/2002 | Flint et al. | |
| 6,362,786 B1 | 3/2002 | Asano et al. | |
| 6,366,261 B1 | 4/2002 | Stout et al. | |
| 6,377,223 B1 | 4/2002 | Clapp et al. | |
| 6,531,985 B1 | 3/2003 | Jones et al. | |
| 6,603,432 B2 | 8/2003 | Hill et al. | |
| 6,630,228 B1 * | 10/2003 | Jarnebrink et al. | 156/278 |
| 6,642,907 B2 | 11/2003 | Hamada et al. | |
| 6,717,801 B1 | 4/2004 | Castell et al. | |
| 6,721,651 B1 * | 4/2004 | Minelli | 701/200 |
| 6,741,221 B2 | 5/2004 | Aisenbrey | |
| 2003/0013418 A1 * | 1/2003 | Kato | 455/90 |

* cited by examiner

*Primary Examiner*—Tan Ho
(74) *Attorney, Agent, or Firm*—Merek, Blackmon & Voorhees, LLC

(57) ABSTRACT

An antenna for wireless communication is integrated into an external member, for example, a molded bumper, on handheld or other portable electronic equipment. The external member is attached to an external surface of electronic equipment, providing shock isolation and protection for the equipment and the antenna. A method of mounting an antenna on portable electronic equipment for enabling wireless communication by the portable electronic equipment comprises mounting on the portable electronic equipment an energy-dissipating structure made of a resilient material, and positioning the antenna in the energy-dissipating structure.

18 Claims, 4 Drawing Sheets

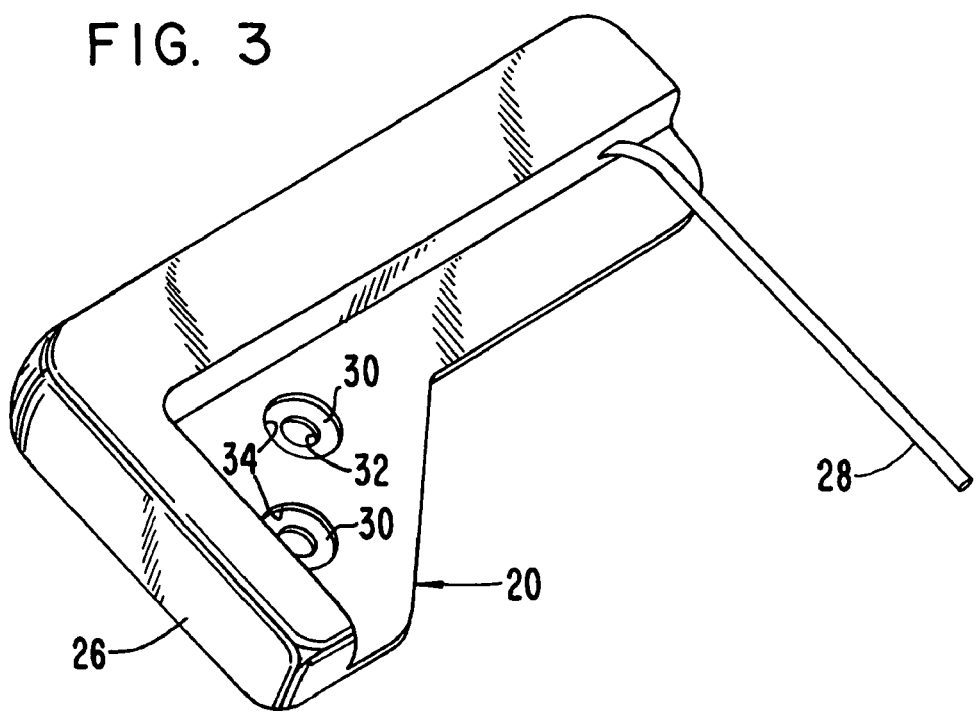
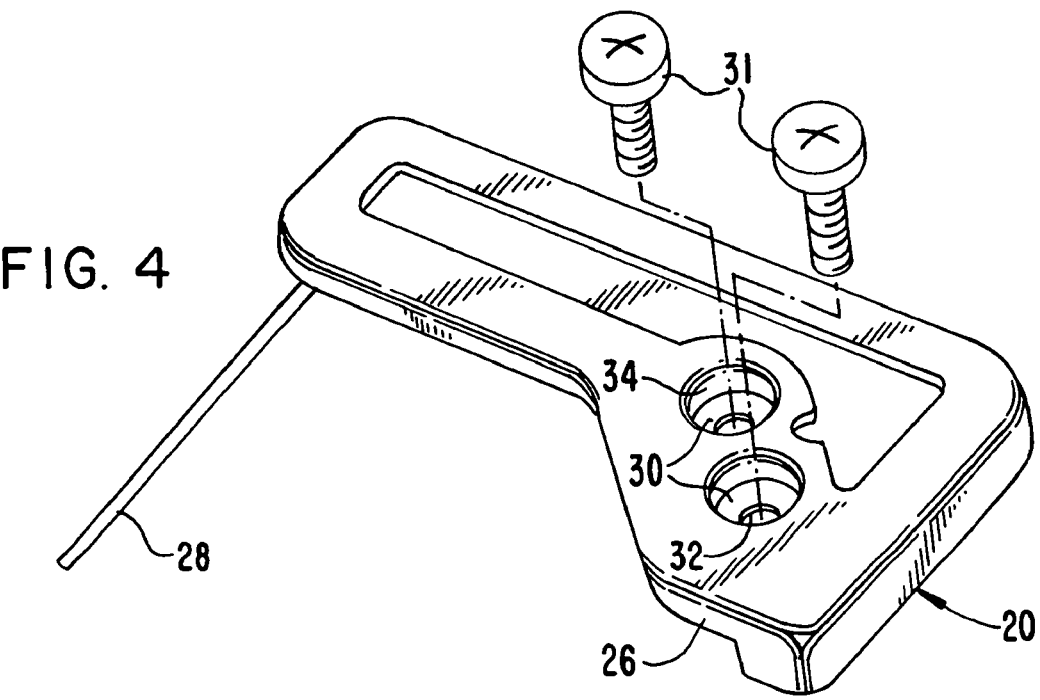

ELECTRONIC EQUIPMENT SHOCK ISOLATION/PROTECTION BUMPER, WITH INTEGRATED ANTENNA

CROSS-REFERENCE TO RELATED APPLICATION

The present application claims the benefit of U.S. Provisional Application No. 60/575,748, filed Jun. 1, 2004, which is hereby incorporated herein by reference in its entirety.

BACKGROUND OF THE INVENTION

The present invention relates to antennas for wireless communication for portable electronic equipment.

SUMMARY OF THE INVENTION

By the present invention, a device comprises the integration of an antenna for wireless communication into an external member, for example, a molded bumper, on handheld or other portable electronic equipment. The external member is attached to an external surface of electronic equipment, providing shock isolation and protection for the equipment and the antenna.

The external member comprises a shock isolating, or energy-dissipating, structure, for example, a resilient material, and the antenna is positioned in the energy-dissipating structure, with a connection from the antenna extending out of the energy-dissipating structure for connection to the electronic equipment. The external surface of the electronic equipment includes at least a first portion lying in a first plane and a second portion lying in a second plane that intersects the first plane, and the energy-dissipating structure is mounted on the outer surface of the housing, extending from the outer surface of the housing, and covering the first and second portions. A bracket in the energy-dissipating structure comprises a material that is more rigid than the resilient material and has at least one protective portion lying closer than the antenna to at least one of the outer surfaces of the resilient material, whereby the antenna is protected from excessive deformation of the resilient material. The protective portions comprise flanges extending generally orthogonal to a main plane of the bracket and limit the deformation of the resilient material.

The antenna is connected to and spaced above the main plane of the bracket, and an opening is defined in the bracket, the opening being in alignment with the antenna and extending across the entire area of the antenna facing the main plane, whereby the bracket does not interfere with antenna reception and transmission patterns and properties. Electrically conductive hardware mounts the antenna to the bracket, and the bracket is made of electrically conductive material, thereby providing a ground plane connection. Where the portable electronic equipment has an electrically conductive housing, electrically conductive hardware mounts the bracket to the housing of the portable electronic equipment, thereby providing a ground plane connection.

The bracket also has another protective portion extending generally orthogonal to the main plane so as to limit the deformation of the resilient material and protect the portable electronic equipment from shock.

The present invention further comprises a method of mounting an antenna on portable electronic equipment for enabling wireless communication by the portable electronic equipment comprising mounting on the portable electronic equipment an energy-dissipating structure made of a resilient material, and positioning the antenna in the energy-dissipating structure.

The antenna can be an inverted f, planar, patch or other style antenna, either custom designed or off the shelf. The antenna can alternatively be constructed from a surface mount or through-hole type antenna, mounted to a printed circuit board with or without impedance matching components. The antenna or antenna assembly has a connection to a transceiver device associated with or comprising the portable electronic equipment. Commonly, this connection is via a coaxial cable comprising a conducting element and a ground/shield element.

BRIEF DESCRIPTION OF THE DRAWINGS

FIG. 3 is a perspective view, from the front, bottom and left side, of the left device of FIG. 1;

FIG. 4 is a perspective view, from the rear, bottom and left side, of the device of FIG. 3;

DETAILED DESCRIPTION OF THE PREFERRED EMBODIMENT

Figure 1:
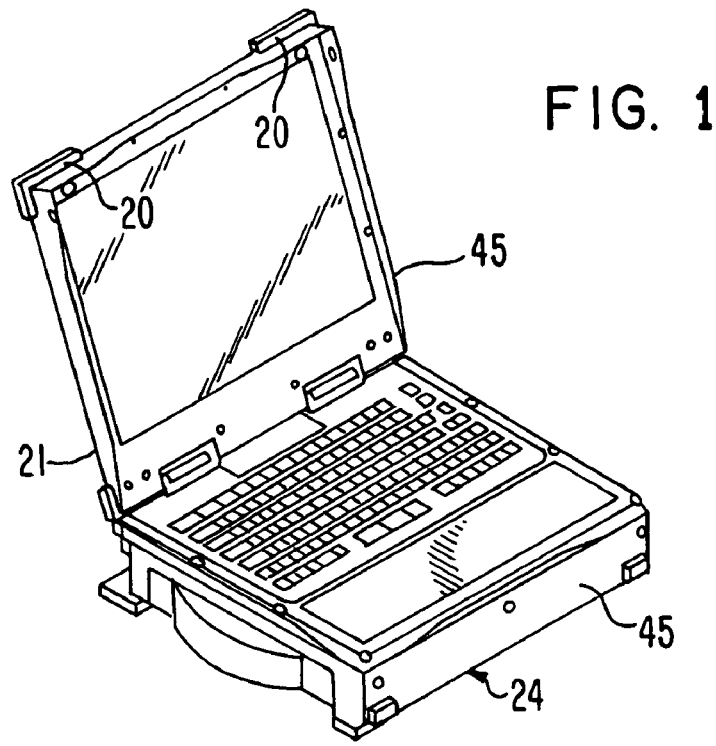
FIG. 1 is a perspective view, from the front, top and left side, of devices according to the present invention mounted on a computer.
Figure 2:
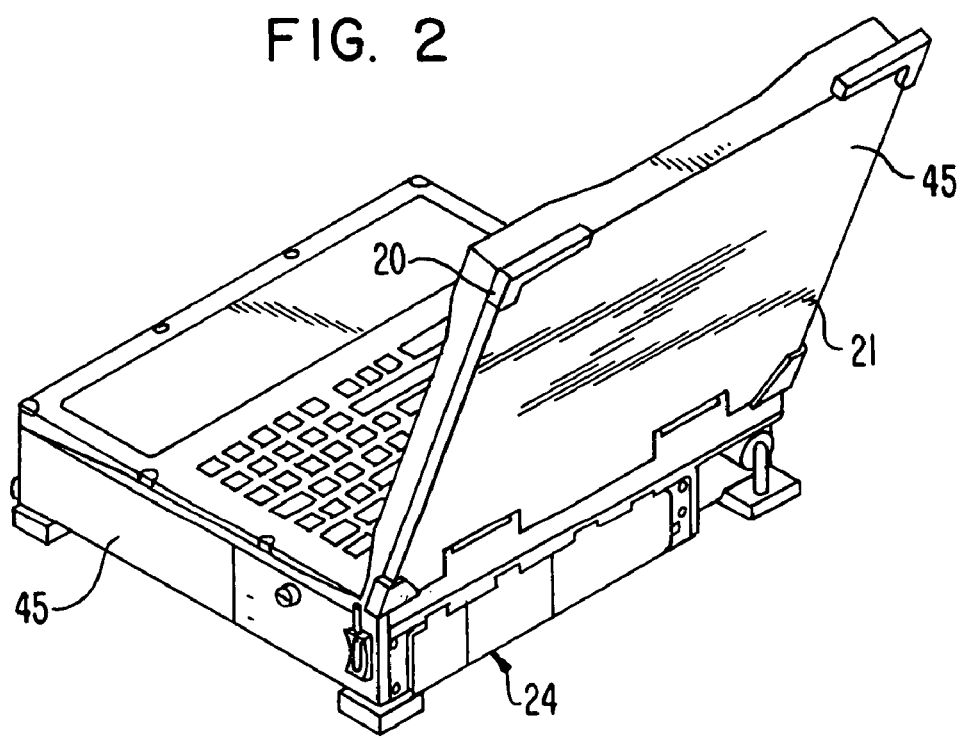
FIG. 2 is a perspective view, from the rear, top and right side, of the devices of FIG. 1 mounted on a computer.

As can be seen from FIGS. 1 and 2, one or more devices according to the present invention, each of which is an external device and is designated generally by the reference numeral 20, is mounted in an external location on electronic equipment 24, such as a portable computer, that enables the device to protect the electronic equipment from shock. The device 20 provides such protection by dissipating, or absorbing, the energy of the shock. In the illustrated embodiment, two devices 20 according to the present invention are mounted at corners of a hinged cover 21 of a portable computer, each device extending beyond the cover in three mutually perpendicular directions—in two mutually perpendicular directions in a plane defined by the outer surface of the cover, and in a direction perpendicular to the plane of the cover. Other locations of the device 20 can also provide shock absorption for the equipment. In addition, just a single device 20 according to the present invention can be used. Furthermore, although the configuration of the illustrated embodiment is especially well suited for mounting at corners, the device according to the present invention can take other configurations that are especially well suited for mounting at other locations of portable electronic equipment. An antenna is mounted in each device 20, as will be described in more detail hereinafter.

As can be appreciated from FIGS. 3 and 4, the device 20 comprises a shock isolating, or energy-dissipating, structure 26, for example, an overmolded resilient material, for example, rubber or plastic, to define a bumper designed to absorb shock. An antenna is positioned in the energy-dissipating structure 26, with a connection 28, such as a coaxial cable, extending from the antenna and out of the energy-dissipating structure for connection to the electronic equipment 24. A bracket 30 in the device 20 comprises a material that is more rigid than the resilient material of the energy-dissipating structure. The connection 28 exits the device 20 at a point where, when the device is mounted to the electronic equipment 24, more specifically, to the housing thereof, the connection can easily be routed inside the housing to the electronic equipment, for example, a radio transceiver associated with a computer. The device 20 is attached to the electronic equipment 24 by screws 31 extending through holes 32 in the bracket 30 and holes 34 in the resilient material of the energy-dissipating structure 26.

Figure 5:
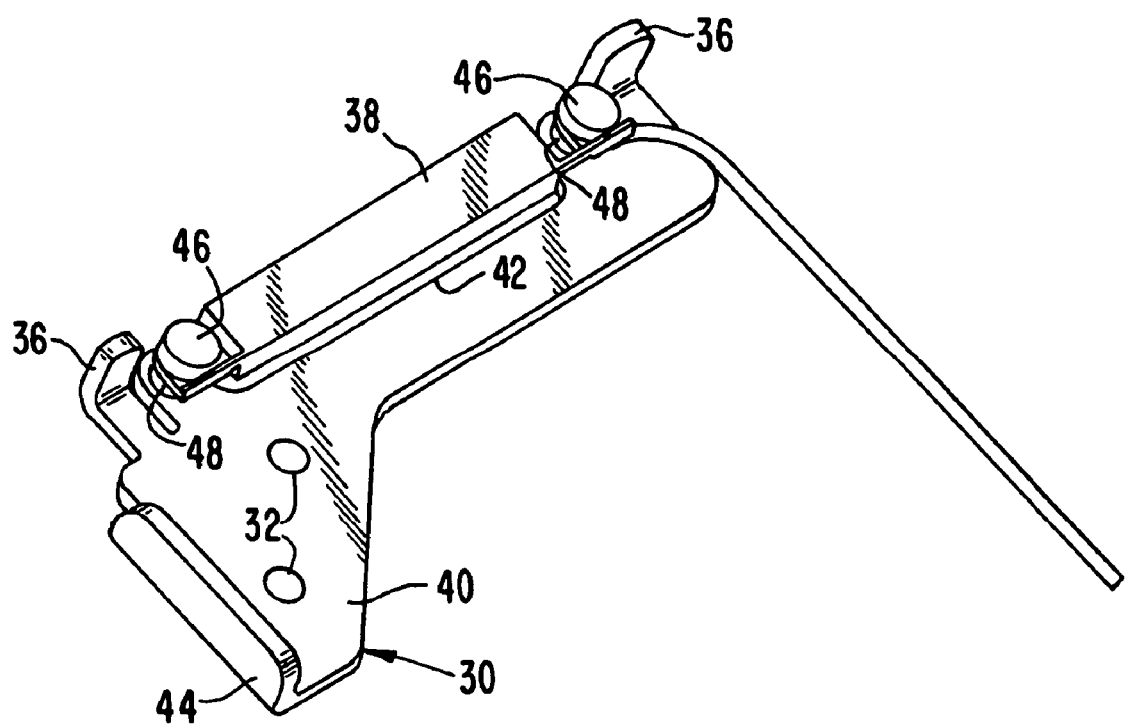
FIG. 5 is a perspective view, from the front, bottom and left side, of the antenna and bracket of the device of FIG. 3.
Figure 6:
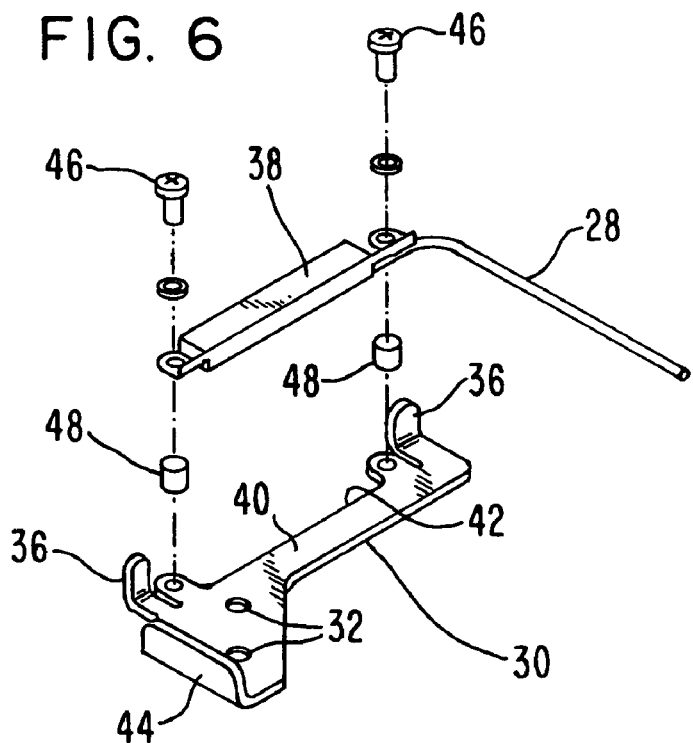
FIG. 6 is an exploded perspective view of the antenna and bracket of FIG. 5.
Figure 7:
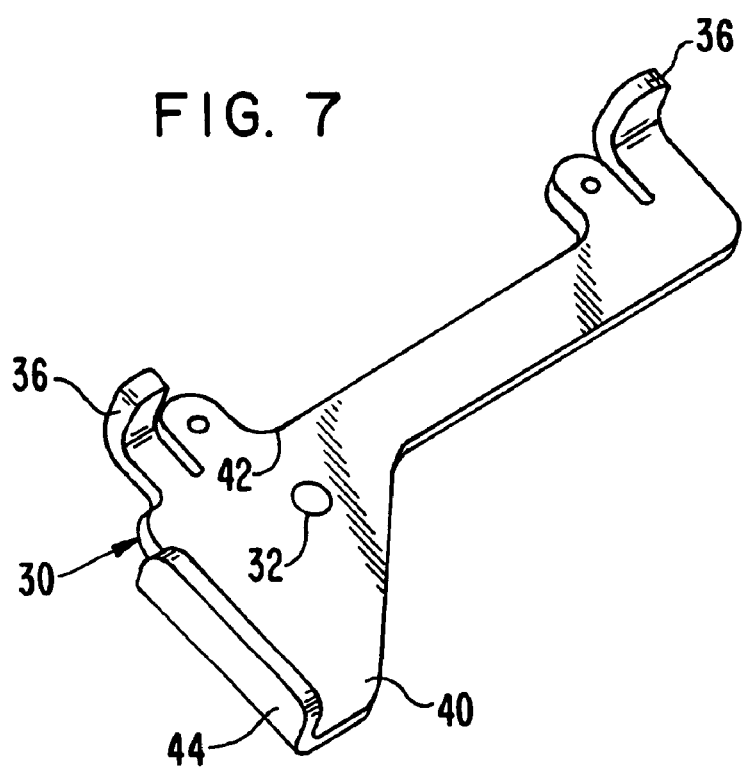
FIG. 7 is a perspective view, from the front, bottom and left side, of the bracket of FIG. 5.

As can be seen from FIGS. 5–7, the bracket 30 has at least one protective portion 36 lying closer than an antenna 38 to at least one of the outer surfaces of the resilient material of the energy-dissipating structure 26, whereby the antenna is protected from excessive deformation of the resilient material. In the illustrated embodiment, there are two protective portions 36 comprising flanges extending generally orthogonal to a main plane 40 of the bracket 30 and limiting the deformation of the resilient material. The protective portions 36 turn up from the plane 40 of the main portion of the bracket 30 at the corners of the bracket. The protective portions 36 are inside the resilient material, thereby preventing the resilient material from deforming so much from external impacts in directions parallel to the plane of the main portion and directions generally transverse to the plane of the main portion that the antenna 38 is impinged on by the impacting object.

As can be appreciated from FIG. 5, the protective portions 36 lie closer than the antenna to an exterior surface of the energy-dissipating structure 26 in two mutually perpendicular directions that are parallel to the main plane 40 of the bracket 30. The protective portions 36 also lie closer than the antenna to another exterior surface of the energy-dissipating structure 26 in a direction generally orthogonal to the main plane 40.

The antenna 38 is connected to and spaced above the main plane 40 of the bracket 30, and an opening 42 is defined in the bracket, under the antenna, the opening being in alignment with the antenna and extending across the entire area of the antenna facing the main plane, whereby the bracket does not interfere with antenna reception and transmission patterns and properties.

The bracket 30 also comprises another protective portion 44 extending generally orthogonal to the main plane 40 so as to limit the deformation of the resilient material 26 and protect the portable electronic equipment 24 from shock. In the illustrated embodiment, the protective portion 44 is a flange, longer than the flanges of the protective portions 36, that turns up from the plane 40 of the main portion, at the end of the bracket 30 to protect the housing containing the electronic equipment 24 from impacts in various directions by limiting the deformation of the resilient material surrounding the bracket at that end. The protective portions 36 are adjacent to a first side of the device 20, and the protective portion 44 is adjacent to a side of the device 20 that extends generally transverse to the first side.

For equipment with a conductive housing 45 and an antenna 38 that requires mounting to a ground plane, electrically conductive mounting hardware electrically ties the bracket 30, which is electrically conductive by, for example being made of metal, to the mounted antenna 38, thereby providing a ground plane connection. As can be seen from FIG. 7, the mounting hardware can comprise screws 46 and spacers 48 between the antenna 38 and the bracket 30. The screws 46 and spacers 48 are conductive, so that the bracket 30 acts as a ground plane; and the bracket is connected to the housing 45 by the screws 31 (FIG. 4) extending through the openings 32 in the main portion, so that the housing 45 also acts as a ground plane.

As alternatives to the screws 46 and spacers 48, the antenna 38 can be mounted via clips or other conductive structures to the bracket 30, the main purpose of which is to act as a backbone around which the resilient material can be molded to form the device 20. The mounting of the antenna 38, the design of the bracket 30 and the shape of the resilient material allow for routing of the antenna cable towards the intended connection. The bracket 30 is designed in shape and size to provide shock protection for both the antenna 38 and the housing 45 of the electronic equipment 24.

The present invention further comprises a method of mounting an antenna 38 on portable electronic equipment 24 for enabling wireless communication by the portable electronic equipment, the method comprising mounting on the portable electronic equipment 24 an energy-dissipating structure 26 made of a resilient material, and positioning the antenna 38 in the energy-dissipating structure.

It will be apparent to those skilled in the art and it is contemplated that variations and/or changes in the embodiments illustrated and described herein may be made without departure from the present invention. For example, although the invention has been described herein in connection with portable electronic equipment, it can also be used with electronic equipment that is not portable. Accordingly, it is intended that the foregoing description is illustrative only, not limiting, and that the true spirit and scope of the present invention will be determined by the appended claims.

The invention claimed is:

1. A device for providing protection for electronic equipment for wireless communication, wherein the electronic equipment has a housing having an outer surface including a first portion lying in a first plane and a second portion lying in a second plane that intersects the first plane, comprising:
   an energy-dissipating structure; and
   an antenna positioned in the energy-dissipating structure, wherein the energy-dissipating structure is adapted to be mounted on the outer surface of the housing, to extend from the outer surface of the housing, and to cover said first and second portions.

2. The device of claim 1, wherein a connection from the antenna extends out of the energy-dissipating structure for connection to electronic equipment.

3. The device of claim 1, wherein the energy-dissipating structure comprises a resilient material.

4. A device for providing protection for electronic equipment for wireless communication comprising:
   an energy-dissipating structure, wherein the energy-dissipating structure comprises a resilient material;
   an antenna positioned in the energy-dissipating structure; and
   a bracket in the energy-dissipating structure, the bracket comprising a material that is more rigid than the resilient material.

5. The device of claim 4, wherein the resilient material has outer surfaces, and the bracket has at least one protective portion lying closer than the antenna to at least one of the outer surfaces of the resilient material, whereby the antenna is protected from excessive deformation of the resilient material.

6. The device of claim 5, wherein the bracket has at least two protective portions lying closer than the antenna to at least two of the outer surfaces of the resilient material.

7. The device of claim 5, wherein the bracket defines a main plane, and the protective portion comprises a flange extending generally orthogonal to said main plane.

8. The device of claim 4, wherein the bracket defines a main plane, and the bracket comprises a protective portion spaced from the antenna and extending generally orthogonal to said main plane for limiting the deformation of the resilient material.

9. The device of claim 4, wherein the antenna is connected to the bracket.

10. The device of claim 9, wherein the bracket defines a main plane, the antenna is spaced above the main plane and has an area facing the main plane, and an opening is defined in the bracket, the opening being in alignment with the antenna and extending across the entire area of the antenna facing the main plane, whereby the bracket does not interfere with antenna reception and transmission patterns and properties.

11. The device of claim 9, further comprising electrically conductive hardware for mounting the antenna to the bracket, wherein the bracket is made of electrically conductive material, thereby providing a ground plane connection.

12. In combination, portable electronic equipment for wireless communication and a device for providing protection for the portable electronic equipment, wherein the electronic equipment has a housing having an outer surface including a first portion lying in a first plane and a second portion lying in a second plane that intersects the first plane, and wherein the device comprises:

an energy-dissipating structure; and an antenna positioned in the energy-dissipating structure, wherein the energy-dissipating structure is mounted on the outer surface of the housing, extending from the outer surface of the housing and covering said first and second portions.

13. The combination of claim 12, wherein a connection from the antenna extends out of the energy-dissipating structure and into the electronic equipment.

14. The combination of claim 12, wherein the device is positioned on the portable electronic equipment such that the device protects the portable electronic equipment from shock.

15. In combination, portable electronic equipment for wireless communication and a device for providing protection for the portable electronic equipment, wherein the device is mounted on the electronic equipment and comprises:

an energy-dissipating structure:

an antenna positioned in the energy-dissipating structure; and a bracket in the energy-dissipating structure, wherein the energy-dissipating structure comprises a resilient material and the bracket comprises a material that is more rigid than the resilient material.

16. The combination of claim 15, wherein the bracket defines a main plane and comprises a protective portion extending generally orthogonal to said main plane, limiting the deformation of the resilient material and protecting the portable electronic equipment from shock.

17. The combination of claim 15, wherein the bracket is made of electrically conductive material, and the portable electronic equipment has an electrically conductive housing, the combination further comprising electrically conductive hardware for mounting the antenna to the bracket and the bracket to the housing of the portable electronic equipment, thereby providing a ground plane connection.

18. A method of mounting an antenna on portable electronic equipment for enabling wireless communication by the portable electronic equipment the portable electronic equipment having a housing having an outer surface including a first portion lying in a first plane and a second portion lying in a second plane that intersects the first plane comprising:

mounting on the outer surface an energy-dissipating structure made of a resilient material such that the energy-dissipating structure extends from the outer surface and covers said first and second portions; and positioning the antenna in the energy-dissipating structure.

* * * * *